(12) United States Patent
Tonar et al.

(10) Patent No.: US 10,444,498 B2
(45) Date of Patent: Oct. 15, 2019

(54) WAVEGUIDE MIRROR DISPLAY SYSTEM

(71) Applicant: Gentex Corporation, Zeeland, MI (US)

(72) Inventors: William L. Tonar, Holland, MI (US); Neil J. Boehm, Allegan, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/605,340

(22) Filed: May 25, 2017

(65) Prior Publication Data
US 2017/0343803 A1    Nov. 30, 2017

Related U.S. Application Data

(60) Provisional application No. 62/341,928, filed on May 26, 2016.

(51) Int. Cl.
*B60R 1/00* (2006.01)
*B60R 1/04* (2006.01)
(Continued)

(52) U.S. Cl.
CPC .......... *G02B 27/0101* (2013.01); *B60K 35/00* (2013.01); *B60R 1/006* (2013.01);
(Continued)

(58) Field of Classification Search
CPC .... G02B 17/00; G02B 27/01; G02B 27/0101; G02B 2027/014; G02B 2027/0141;
(Continued)

(56) References Cited

U.S. PATENT DOCUMENTS

| 5,434,407 A | 1/1995 | Bauer et al. |
| 5,448,397 A | 9/1995 | Tonar |

(Continued)

FOREIGN PATENT DOCUMENTS

| EP | 1599861 B1 | 8/2010 |
| EP | 1952189 B1 | 6/2016 |

OTHER PUBLICATIONS

Ashmead, Allan, DigiLens, Inc., "Electronically Switchable Bragg Gratings Provide Versatility," Lightwave, Passive and Active Components, Special Reports, Mar. 1, 2001, 7 pages, Web. Oct. 9, 2017. </http://www.lightwaveonline.com/articles/print/volume-18/issue-3/special-report/electronically-switchable-bragg-gratings-provide-versatility-53466867.html>.

(Continued)

*Primary Examiner* — Loha Ben
(74) *Attorney, Agent, or Firm* — Price Heneveld LLP; Bradley D. Johnson

(57) ABSTRACT

A vehicle display system is disclosed. The system comprises an electro-optic device configured to switch between a mirror state and a light-transmissive state. The electro-optic device comprises a first substrate and a second substrate forming a cavity. The cavity is configured to retain an electro-optic medium that is variably transmissive such that the electro-optic device is operable between substantially clear and darkened states. The system further comprises a substantially transparent display disposed adjacent to the electro-optic device. The electro-optic device is converted to the darkened state when the substantially transparent display is emitting light.

20 Claims, 6 Drawing Sheets

(51) Int. Cl.
  *B60R 1/08* (2006.01)
  *B60R 1/12* (2006.01)
  *G09G 3/38* (2006.01)
  *B60K 35/00* (2006.01)
  *G02B 27/01* (2006.01)
  *G02F 1/157* (2006.01)

(52) U.S. Cl.
  CPC ............... *B60R 1/04* (2013.01); *B60R 1/088* (2013.01); *B60R 1/12* (2013.01); *G02F 1/157* (2013.01); *G09G 3/38* (2013.01); *B60K 2350/106* (2013.01); *B60K 2350/2056* (2013.01); *B60K 2350/2095* (2013.01); *B60R 2001/1215* (2013.01); *B60R 2001/1253* (2013.01); *B60R 2300/205* (2013.01); *G02B 2027/0141* (2013.01); *G09G 2380/10* (2013.01)

(58) Field of Classification Search
  CPC . G02B 2027/0147; G02F 1/00; G02F 1/0018; G02F 1/01; G02F 1/011; G02F 1/081; G02F 1/03; G02F 1/15; G02F 1/153; G02F 1/157; G02F 1/163; G02F 1/20; B60R 1/006; B60R 1/02; B60R 1/04; B60R 1/08; B60R 1/088; B60R 1/12; B60R 2001/1215; B60R 2001/1253; B60R 2300/205; G09G 3/38; G09G 2380/10; B60K 35/00; B60K 2350/106; B60K 2350/2056; B60K 2350/2095
  USPC ....... 359/245, 265, 267, 270, 275, 315, 320; 345/105; 362/494, 509, 514
  See application file for complete search history.

(56) References Cited

U.S. PATENT DOCUMENTS

| | | | |
|---|---|---|---|
| 5,451,822 A | 9/1995 | Bechtel et al. | |
| 5,818,625 A | 10/1998 | Forgette et al. | |
| 5,856,842 A | 1/1999 | Tedesco | |
| 6,020,987 A | 2/2000 | Baumann et al. | |
| 6,055,089 A * | 4/2000 | Schulz | G02F 1/163 136/251 |
| 6,157,480 A | 12/2000 | Anderson et al. | |
| 6,690,268 B2 * | 2/2004 | Schofield | B60C 23/00 340/438 |
| 7,209,277 B2 * | 4/2007 | Tonar | B60Q 1/2665 359/265 |
| 7,379,224 B2 * | 5/2008 | Tonar | B60Q 1/2665 359/265 |
| 7,579,939 B2 * | 8/2009 | Schofield | B60C 23/00 340/425.5 |
| 7,579,940 B2 * | 8/2009 | Schofield | B60C 23/00 340/425.5 |
| 7,583,184 B2 * | 9/2009 | Schofield | B60C 23/00 340/438 |
| 7,663,798 B2 * | 2/2010 | Tonar | B60Q 1/2665 359/265 |
| 7,719,750 B2 * | 5/2010 | Tonar | B32B 17/06 359/265 |
| 7,855,755 B2 * | 12/2010 | Weller | B60R 1/12 349/11 |
| 7,859,737 B2 * | 12/2010 | McCabe | B60R 1/12 359/265 |
| 7,978,393 B2 * | 7/2011 | Tonar | B60R 1/088 359/265 |
| 8,179,236 B2 * | 5/2012 | Weller | B60R 1/12 340/425.5 |
| 8,441,707 B2 * | 5/2013 | Lam | G02B 5/23 359/241 |
| 9,134,585 B2 * | 9/2015 | Tonar | B60R 1/088 |
| 9,176,357 B2 * | 11/2015 | Lam | B60J 3/04 |
| 9,550,457 B2 * | 1/2017 | Green | G02F 1/1339 |
| 2002/0154379 A1 | 10/2002 | Tonar et al. | |
| 2010/0097469 A1 | 4/2010 | Blank et al. | |
| 2014/0140654 A1 | 5/2014 | Brown et al. | |
| 2014/0176528 A1 | 6/2014 | Robbins | |
| 2018/0105114 A1 * | 4/2018 | Geerlings | G02F 1/163 |

OTHER PUBLICATIONS

International Search Report and Written Opinion of the International Searching Authority, or the Declaration, dated Aug. 24, 2017, for International Application No. PCT/US2017/034526, filed May 25, 2017, 9 pages.

* cited by examiner

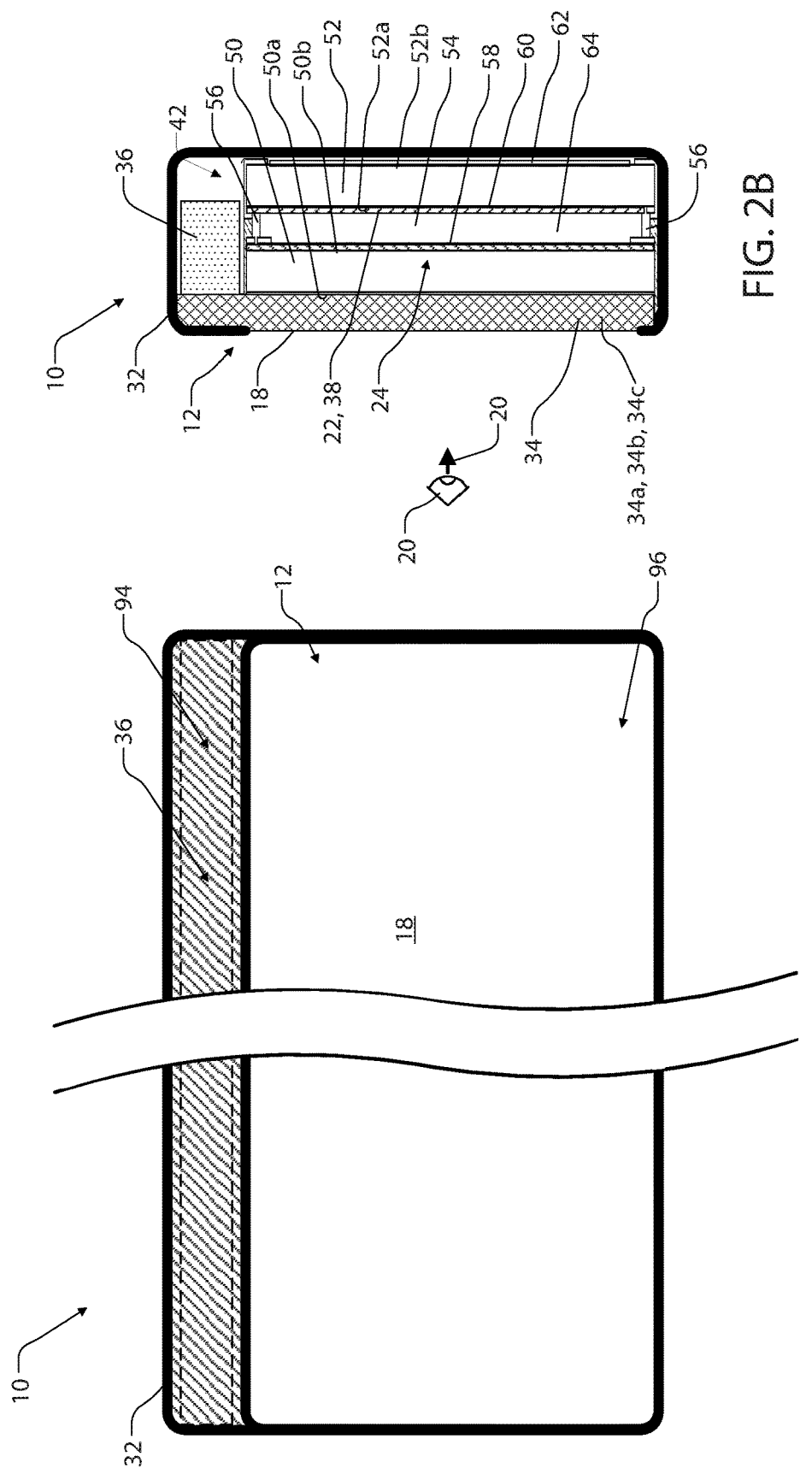

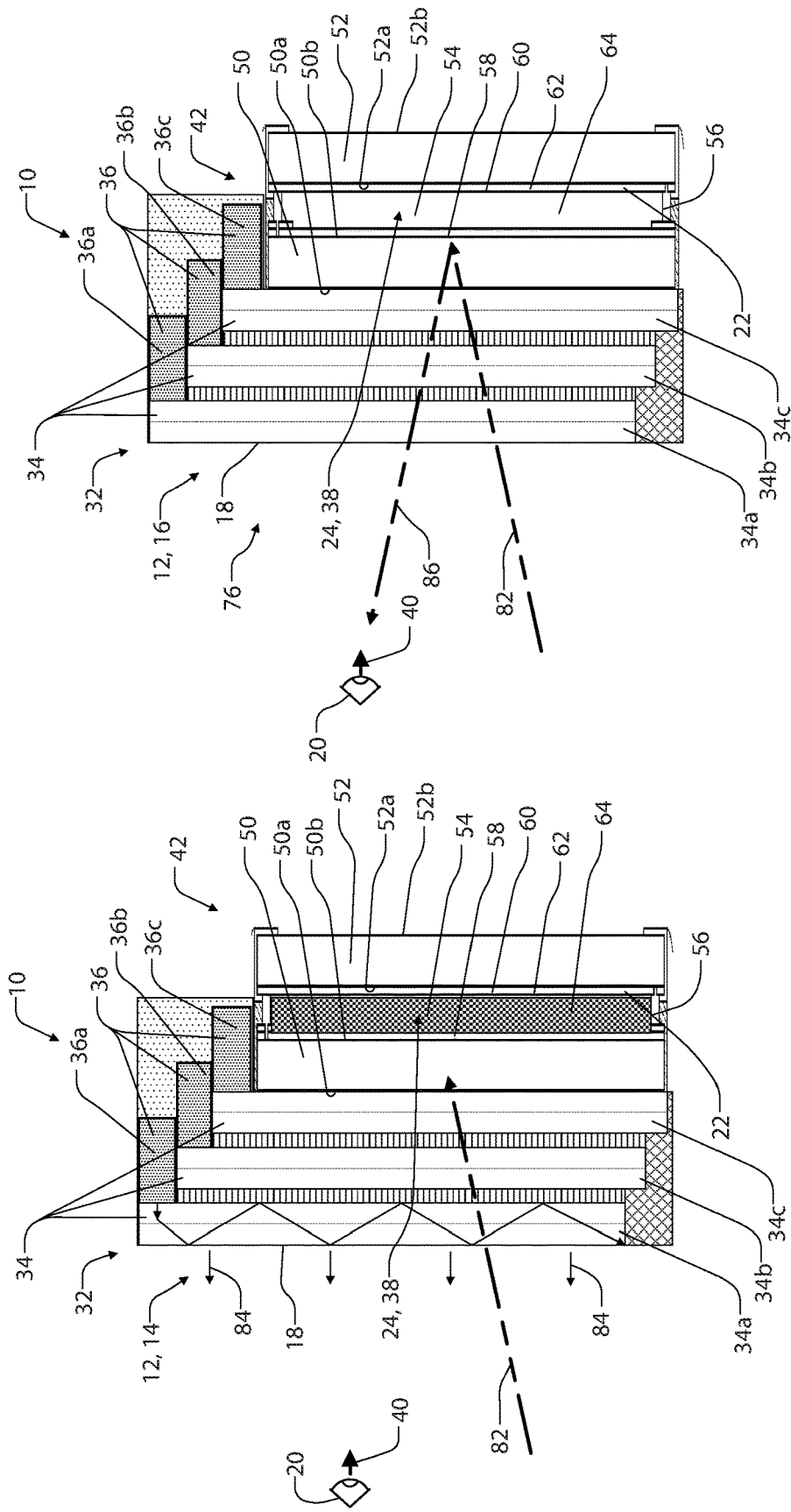

WAVEGUIDE MIRROR DISPLAY SYSTEM

CROSS-REFERENCE TO RELATED APPLICATION

This application claims priority to and the benefit under 35 U.S.C. § 119(e) of U.S. Provisional Patent Application No. 62/341,928, filed on May 26, 2016, entitled "WAVEGUIDE MIRROR DISPLAY SYSTEM," the entire disclosure of which is hereby incorporated herein by reference.

TECHNOLOGICAL FIELD

The present disclosure generally relates to an emissive display system and, more particularly, an emissive display system having an electro-optic device.

BACKGROUND OF THE DISCLOSURE

Electro-optic assemblies are being used in various vehicular and building applications, e.g., within rearview display devices and variably transmissive windows. Use of these assemblies in various applications can be limited by cost, aesthetic and functional considerations. Accordingly, new electro-optic assembly designs, configurations and assemblies, along with methods of making them, are needed particularly in view of reducing material and processing costs, improving aesthetics, and/or enhancing functionality.

SUMMARY OF THE INVENTION

According to one aspect of the present disclosure, a vehicle display system is disclosed. The system comprises an electro-optic device comprising a first substantially transparent substrate, a second substantially transparent substrate and an electro-optic medium. The first substantially transparent substrate has first and second surfaces disposed on opposite sides thereof. At least one of the first and second surfaces comprises a first electrically conductive layer. The second substantially transparent substrate has third and fourth surfaces disposed on opposite sides thereof. At least one of the third and fourth surfaces comprises a second electrically conductive layer. The electro-optic medium is disposed in a cavity formed between the first substantially transparent substrate and the second substantially transparent substrate. The electro-optic medium is variably transmissive.

The system further comprises a substantially transparent display disposed adjacent to the electro-optic device and at least one display driver configured to display image data on the substantially transparent display. A controller is in communication with the electro-optic device and the at least one display driver. The controller is operable to control a transmission state of the electro-optic device between a transparent state and an opaque state, and control the display driver to display the image data on the substantially transparent display.

According to another aspect of the present disclosure, a vehicle display system is disclosed. The system comprises an electro-optic device comprising a first substantially transparent substrate, a second substantially transparent substrate and an electro-optic medium. The first substantially transparent substrate has first and second surfaces disposed on opposite sides thereof. At least one of the first and second surfaces comprises a first electrically conductive layer. The second substantially transparent substrate has third and fourth surfaces disposed on opposite sides thereof. At least one of the third and fourth surfaces comprises a second electrically conductive layer. The electro-optic medium is disposed in a cavity formed between the first substantially transparent substrate and the second substantially transparent substrate. The electro-optic medium is variably transmissive. The system further comprises a substantially transparent display disposed adjacent to the electro-optic device. The electro-optic device is configured to convert a transmission state of the electro-optic device between a transparent state and an opaque state.

According to yet another aspect of the present disclosure, a vehicle display apparatus is disclosed. The apparatus comprises an electrochromic device comprising a reflective element. The reflective element is configured to reflect a reflected view of a rearward directed field of view from the vehicle. The apparatus further comprises a substantially transparent display disposed adjacent to the electro-optic device and at least one display driver. The display driver is configured to display image data on the substantially transparent display. The apparatus further comprises a controller in communication with the electro-optic device and the at least one display driver. The controller is operable to control the electro-optic element to selectively control a mirror state and the substantially transparent state of the electrochromic device in response to the transmission state of the electro-optic element and control the display driver to display the image data on the substantially transparent display.

These and other aspects, objects, and features of the present disclosure will be understood and appreciated by those skilled in the art upon studying the following specification, claims, and appended drawings. It will also be understood that features of each embodiment disclosed herein may be used in conjunction with, or as a replacement for, features of the other embodiments.

BRIEF DESCRIPTION OF THE DRAWINGS

The present disclosure will become more fully understood from the detailed description and the accompanying drawings, wherein:

FIG. 2A is a front view of a display assembly according to one aspect of the disclosure;

FIG. 2B is a side cross-sectional view of the display assembly of FIG. 2A, in accordance with an aspect of the disclosure;

FIG. 3A is a detailed cross-sectional view of a display assembly in a display state, in accordance with another aspect of the disclosure;

FIG. 3B is a detailed cross-sectional view of a display assembly in a transparent or mirror state, in accordance with another aspect of the disclosure;

DETAILED DESCRIPTION OF EMBODIMENTS

Figure 1:
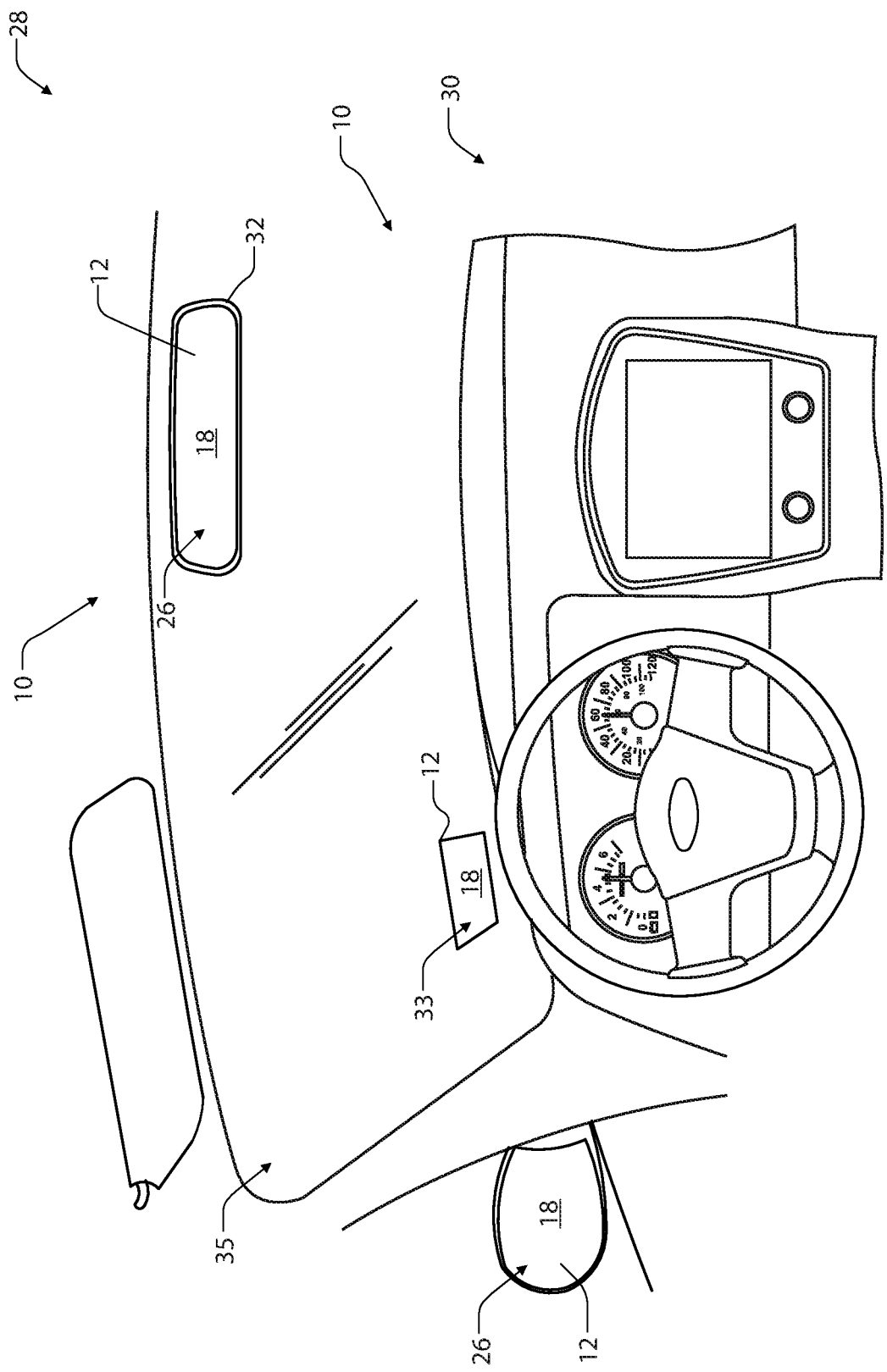
FIG. 1 is a projected view of a passenger compartment of a vehicle comprising a display system.

The present illustrated embodiments reside primarily in combinations of method steps and apparatus components related to an electro-optic device. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-3, an emissive display system 10 is depicted including a substantially transparent display. The substantially transparent display may correspond to a waveguide display 12 or other emissive display device. The emissive display system 10 may be operable to change operating states from a display state 14 as demonstrated in FIG. 3A to a transparent state 16 demonstrated in FIG. 3B. In the display state 14, a viewing surface 18 of the display system 10 may be configured to project image data outward toward a viewer 20. In the transparent state 16, the display 12 may be substantially transparent allowing a reflective surface 22 to function as a mirror device 24. As further discussed herein, the display 12 may provide for various combinations of displaying image data and/or light reflected demonstrating a scene rearward of a vehicle 28. For example, the display 12 may comprise an optic device being configured to provide various levels of transmission between the display state 14 and the transparent state 16.

As described herein, the term substantially transparent, as used to describe the waveguide display 12 or waveguide display element and other components discussed herein, may describe a relative transmissivity of an object configured to transmit light therethrough. For example, the object may be considered substantially transparent if the element (e.g., the waveguide display 12) allows for a majority of light impinging upon a surface to pass through the object. Accordingly, a substantially transparent element may be configured to efficiently transmit one or more wavelengths of light therethrough such that the light entering one side is visible on an opposite side. In an exemplary embodiment, the substantially transparent element may correspond to the waveguide display 12 configured to transmit greater than 50% of light received. In some embodiments, the waveguide display 12 may be configured to transmit greater than 60%, 80%, or 90%.

In an exemplary embodiment, the display system 10 may be configured to function as a rearview display 26 for the vehicle 28. In the display state 14, the waveguide display 12 may display image data on the viewing surface 18. The image data may be captured by one or more imagers in communication with the display system 10. Such imagers are further discussed in reference to FIG. 5 and may be configured to capture image data of various fields of view of a passenger compartment 30 and/or various views of scenes proximate the vehicle 28. In this way, the display system 10 may selectively display the image data, a reflected scene, or a combination of the image data and the reflected scene. The combination of the reflected scene and the image data superimposed over or otherwise combined may provide for a hybrid or augmented display of the reflected scene and image data or graphic data, which may be utilized to enhance the reflected scene.

A display assembly 32 of the display system 10 may be implemented as an interior rearview display 26, a side-mirror display, and/or various other mirrored devices. Though discussed in reference to an automotive vehicle, the display system 10 may be utilized for various applications including, but not limited to, transit vehicles, nautical vessels, aircraft, etc. Accordingly, the disclosed embodiments may be combined or modified to suit various applications without departing from the spirit of the disclosure.

In some embodiments, the display assembly 32 may be implemented as a heads-up display 33, which may be affixed or laminated to a windscreen 35 of the vehicle 28. In such a configuration, the electro-optic device 42 discussed herein may be configured to be substantially transparent. Such a configuration may utilize substantially transparent electrodes corresponding to the first electrode 58 and the second electrode 60. Such electrodes may comprise substantially transparent conductive materials, such as indium tin oxide (ITO) and other similar materials. In this configuration, the controller of the electro-optic device 42 may be configured to selectively control the transmittance of the electro-optic device 42 to control a contrast between the windscreen 35 and the display assembly 32. In this way, the controller may control the transmittance of the electro-optic device 42 to provide a contrast to improve a visibility of the image data and/or graphics displayed on the viewing surface 18.

In some embodiments, the heads-up display 33 may correspond to a standalone device that may be mounted or attached to a dashboard or console of the vehicle 28. In such embodiments, the heads-up display 33 may correspond to a pop-up display that may be selectively extended or retracted from the dashboard. In operation, the heads-up display 33 may be substantially transparent depending on an operating configuration controlled by the controller. Accordingly, the controller may be configured to selectively adjust a transmittance or transparency of the electro-optic device 42 to adjust a contrast of the image data and/or graphics displayed on the heads-up display 33.

Referring now to FIGS. 2A and 2B, a front view and a side, cross-sectional view of the display assembly 32 are shown, respectively. In some embodiments, the disclosure may provide for various embodiments of the display system 10 operable to selectively function as a digital image display in the display state 14 and a mirror device 24 in the transparent state 16. The waveguide display 12 may be substantially transparent and comprise at least one waveguide 34. For example, the at least one waveguide 34 may correspond to a plurality of waveguides 34, which may be configured to display red, green, and/or blue image data.

In some embodiments, a first waveguide 34a of the plurality of waveguides 34 may be configured to display both red and blue while a second waveguide 34b may be configured to display green. In such embodiments, the at least one waveguide 34 may correspond to two waveguides. In some embodiments, the at least one waveguide 34 may be configured to display red, green, and blue from a single waveguide (e.g., the first waveguide 34a). In such embodiments, the total number of waveguides may vary based on the number required to display the image data. Though three waveguides (e.g., 34a, 34b, and 34c) are demonstrated in a number of exemplary embodiments, the number of waveguides may vary depending on the particular combination of colors emitted through the at least one waveguide 34. Accordingly, the disclosure provides for a flexible solution that may comprise various configurations to suit a desired application.

In an exemplary embodiment, the plurality of waveguides 34 may comprise a first waveguide 34a, a second waveguide 34b, and a third waveguide 34c. The plurality of waveguides 34 may be configured to direct image data through the viewing surface 18. The waveguide display 12 may further comprise a plurality of display drivers 36 configured to project image data into each waveguide of the plurality of waveguides 34. Each of the display drivers 36 may comprise a microdisplay, laser module, beam expansion, collimator, and relay optics configured to project the image data. Further details regarding the waveguide display 12 are discussed in reference to FIGS. 3A, 3B, and 3C.

A mirror element 38 may be disposed in front of or behind the waveguide display 12 relative to a viewing direction 40 of the viewer 20. The mirror element 38 may comprise an electro-optic device 42 configured to vary a reflectivity in response to an applied voltage or control signal communicated from the controller. The mirror element 38 may include a first (or front) element 50 and a second (or rear) element 52. The first element 50 and the second element 52 may be sealably bonded and spaced-apart relation to define a chamber 54. Front element 50 has a front surface 50a and a rear surface 50b. The rear element 52 has a front surface 52a and a rear surface 52b. For purposes of further reference, the front surface 50a of the front element 50 may be referred to as the first surface, and the rear surface 50b of the front element 50 may be referred to as a second surface. The front surface 52a of the rear element 52 may be referred to as a third surface, and the rear surface 52b of rear element 52 may be referred to as a fourth surface. In an exemplary embodiment, both elements 50 and 52 may correspond to substantially transparent substrates sealably bonded via a seal member 56. In some embodiments, the waveguide 34c may be utilized as or form the first element 50 or the second element 52.

The mirror element 38 may include a first electrode 58 carried on one of the second surface 50b and the third surface 52a. A second electrode 60 may be disposed on one of the second surface 50b and third surface 52a. The first electrode 58 may comprise one or more layers and may function as a color suppression coating. The second electrode 60 may be reflective, transflective, or comprise a reflector layer 62 on the fourth surface 52b. In such embodiments, the second electrode 60 may be substantially transparent. In an exemplary embodiment, the second electrode 60 is reflective or transflective and configured to reflect a scene rearward of the vehicle 28.

The chamber 54 formed by the first element 50 and the second element 52 may be configured to retain an electro-optic medium 64 configured to vary in transmittance in response to the voltage received from a controller via the first electrode 58 and the second electrode 60. The electro-optic medium 64 may correspond to an electro-chromic medium. Examples of electro-optic mirror constructions are disclosed in U.S. Pat. No. 5,434,407, entitled "AUTOMATIC REARVIEW MIRROR INCORPORATING LIGHT PIPE," issued Jan. 18, 1995, to F. T. Bauer et al.; U.S. Pat. No. 5,448,397, entitled "OUTSIDE AUTOMATIC REARVIEW MIRROR FOR AUTOMOTIVE VEHICLES," issued Sep. 5, 1995, to W. L. Tonar; U.S. Pat. No. 5,451,822, entitled "ELECTRONIC CONTROL SYSTEM," issued Sep. 19, 1995, to J. H. Bechtel et al.; U.S. Pat. No. 5,818,625, entitled "ELECTROCHROMIC REARVIEW MIRROR INCORPORATING A THIRD SURFACE METAL REFLECTOR," issued Oct. 6, 1998, to Jeffrey A. Forgette et al.; and U.S. Pat. No. 6,157,480, entitled "IMPROVED SEAL FOR ELECTROCHROMIC DEVICES," filed on Dec. 5, 2000. Each of these patents and the patent application are commonly assigned with the present invention and the disclosures of each, including the references contained therein, are hereby incorporated herein in their entirety by reference.

In an exemplary embodiment, the electro-optic device 42 may be color neutral. For example, the electro-optic device 42 may correspond to a color neutral electro-chromic element. The color neutral element may darken in a gray-scale, which may prevent a discoloration of the image data displayed on the viewing surface 18. An example of a color neutral electro-chromic element is described in U.S. Pat. No. 6,020,987, entitled "ELECTROCHROMIC MEDIUM CAPABLE OF PRODUCING A PRE-SELECTED COLOR," issued Feb. 1, 2000, the entire disclosure of which is incorporated herein by reference.

Figure 3C:
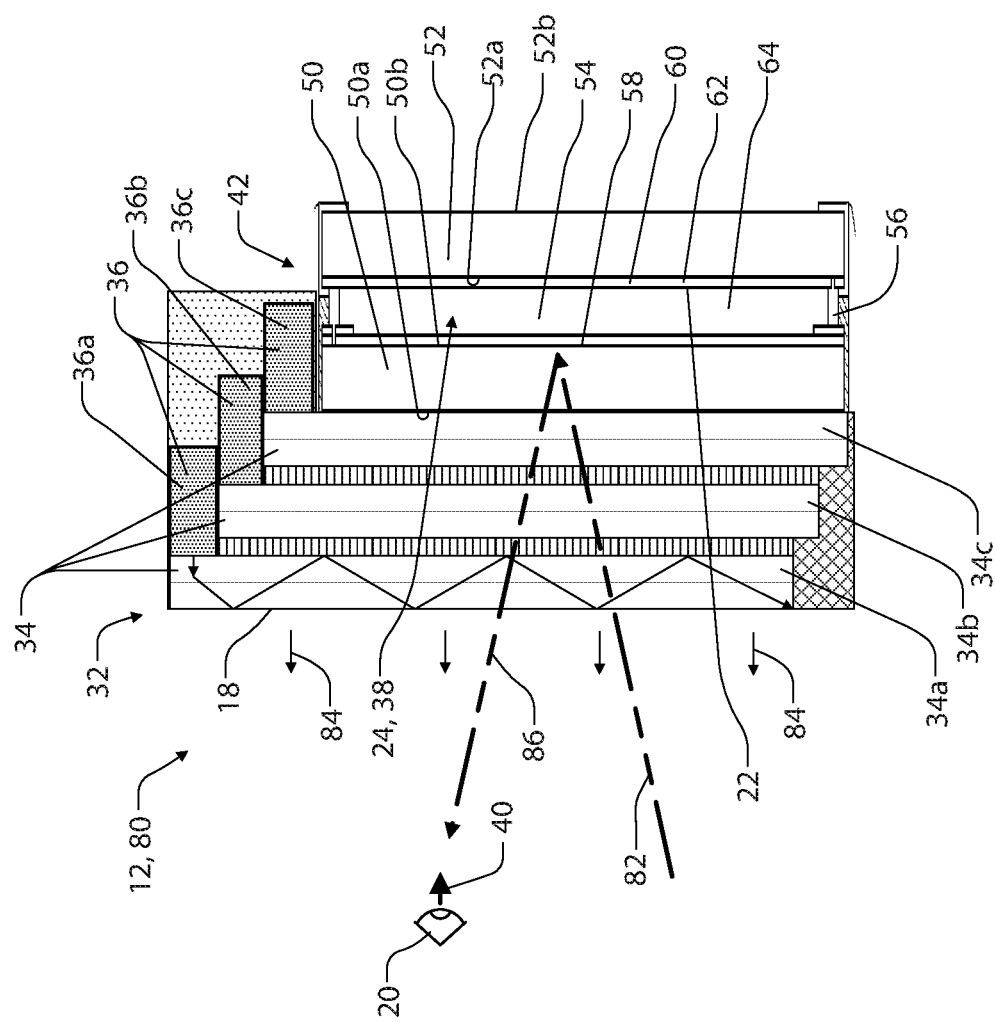
FIG. 3C is a detailed cross-sectional view of a display assembly in a hybrid mirror display state, in accordance with another aspect of the disclosure.

Referring now to FIGS. 3A, 3B, and 3C, the side, cross-sectional views of the display assembly 32 are demonstrated in the display state 14, the transparent state 16 (e.g. a transparent configuration) or mirror state 76 (e.g. a mirror configuration), and a combined mirror-display state 80. The combined mirror-display state 80 may correspond to a hybrid display configuration or augmented display of the reflected scene and image data or graphic data, which may be utilized to enhance the reflected scene. As discussed previously, in some embodiments, the waveguide display 12 may comprise at least one or a plurality of waveguides 34. The plurality of waveguides 34 may correspond to a first waveguide 34a, a second waveguide 34b, and a third waveguide 34c. The first waveguide 34a may be configured to receive a first image data from at least one display driver 36. The number of display drivers 36 may correspond to the number of waveguides 34. For example, the first waveguide 34a may be configured to receive a first image data from a first display driver 36a, the second waveguide 34b may be configured to receive a second image data from a second display driver 36b, and the third waveguide 34c may be configured to receive a third image data from a third display driver 36c.

As described in reference to the first display driver 36a, the second display driver 36b, and the third display driver 36c, each of the display drivers 36 may be configured to project a different color of light. However, as previously discussed, the number of waveguides 34 may correspond to one or more. In such embodiments, the number of display drivers 36 may similarly vary and may accordingly be operable to emit one or more colors of light (e.g., red and blue, red, green and blue, etc.) into the at least one waveguide 34. Additionally, the at least one display driver 36 may be configured to comprise separate display drivers 36 for each color transmitted. For example, the first display driver 36*a* may be configured to project the first image data corresponding to red light, the second display driver 36*b* may be configured to project the second image data corresponding to green light, and the third display driver 36*c* may be configured to project the third image data corresponding to blue light.

Further details describing how light can be projected into a waveguide are disclosed in U.S. Pat. No. 5,856,842, entitled, "APPARATUS FACILITATING EYE-CONTACT VIDEO COMMUNICATIONS" assigned to Kaiser Optical Systems, Inc., which is incorporated herein by reference in its entirety. The display drivers 36 may comprise a diffractive element at the input to each waveguide 34. The diffractive element may comprise a volume holographic element or a grating. In some embodiments, the grating may comprise a Bragg grating. The light corresponding to the image data or graphical content projected into each of the waveguides 34 may be collimated by a collimator in order to maintain image content as it propagates along the viewing surface 18. By utilizing this process, the image data display on the viewing surface 18 may appear to be focused at infinity. The projection of the image data having an appearance of being focused at infinity may limit a perceived eye strain of the viewer 20 due to accommodation between a distance of the display assembly 32 and the far-off objects typically viewed while operating the vehicle 28.

Referring now to FIGS. 3A, 3B, and 3C, the controller may be operable to selectively activate the display assembly 32 in a plurality of states. In a first state (e.g., the display state 14), the display assembly 32 may be configured to function as a display screen configured to display image data. The display state 14 is demonstrated in FIG. 3A and may comprise the controller activating one or more of the display drivers 36 to display image data, while controlling the transmittance of the electro-optic device 42 to limit or block the transmission of a received light 82 from impinging upon the mirror element 38.

For example, in the display state 14, the controller may control the transmittance of the electro-optic device 42 to darken the electro-optic device 42 in response to a transmission control signal or voltage level. In this way, a high level of contrast may be achieved to provide a dark background over which the waveguides 34 may display the image data as generated light 84. In an exemplary embodiment, the electro-optic device 42 may darken or increase in opacity such that the mirror element 38 may be less than 4% reflective. In some embodiments, the electro-optic 42 device may limit the effective reflectance of the mirror element to less than 2%. The contrast of the electro-optic device 42 may ensure that the generated light 84 is clearly visible without displaying the received light 82 from the mirror element 38. As discussed herein, the display state 14 may provide for the display of image data and may be received by one or more imagers in communication with the display system 10 to assist with the operation of the vehicle 28.

In a second state (e.g., the transparent state 16 or mirror state 76), the controller may control the transmittance of the electro-optic device 42 to allow the received light 82 to pass through the electro-optic medium 64. In this configuration, the controller may further deactivate, the display drivers 36 such that the waveguides 34 are substantially transparent. Accordingly, the received light 82 may be transmitted through the waveguides 34 and reach the mirror element 38 significantly unabated. The received light 82 may be reflected from the mirror element 38 as reflected light 86. In this configuration, the reflected light 86 may be visible to an operator or passenger of the vehicle such that the scene rearward of a vehicle 28 may be visible similar to a conventional rearview mirror.

In a third state, the display system 10 may be configured to function in the combined mirror-display state 80. In such a state, the controller may be operable to control the transmittance of the electro-optic device 42 to allow the received light 82 to pass through the electro-optic medium 64, similar to the transparent state 16. In this configuration, the received light 82 may be transmitted through the waveguides 34, and the reflected light 86 may be visible to an operator of the vehicle 28. Additionally, the controller may be configured to activate one or more of the waveguides 34 of the waveguide display 12 to superimpose graphics or image data as the generated light 84 over the reflected light 86 demonstrates the rearward directed scene. The graphics and/or image data may correspond to various information configured to assist in operation of the vehicle 28 as further discussed in reference to FIG. 5.

Figure 4A:
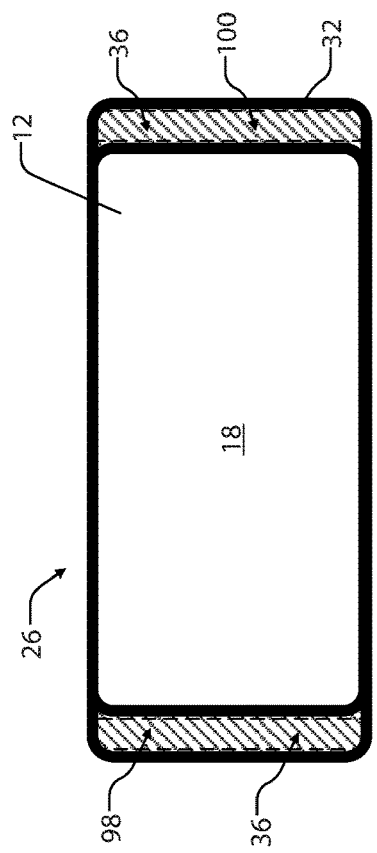
FIG. 4A is a front view of a display assembly demonstrating a configuration of a display driver for a waveguide of the display assembly.

Referring now to FIGS. 2A, 4A, 4B, and 4C, various configurations of the display system 10 are shown demonstrating a configuration of a display driver for the waveguide display 12. In FIG. 2A, the display drivers 36 are shown extending along an upper portion 94 of the display assembly 32. In FIG. 4A, the display drivers 36 are shown extending along an upper portion 94 and a lower portion 96 of the display assembly 32. The upper portion 94 and lower portion 96 may correspond to horizontal perimeter portions of the display assembly 32 relative to the orientation of the display assembly 32 illustrated in FIG. 1. As shown in FIG. 4A, at least one of the display drivers 36 and/or various corresponding drive circuits or hardware may be distributed along the upper portion 94 and the lower portion 96 to provide a distributed edge mounted display.

Figure 4B:
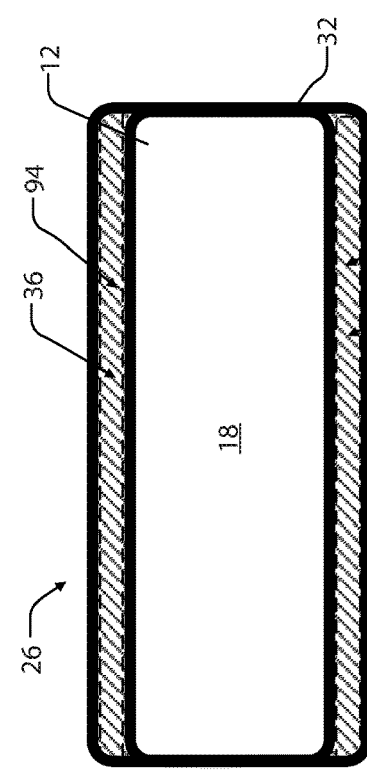
FIG. 4B is a front view of a display assembly demonstrating a configuration of a display driver for a waveguide of the display assembly.
Figure 4C:
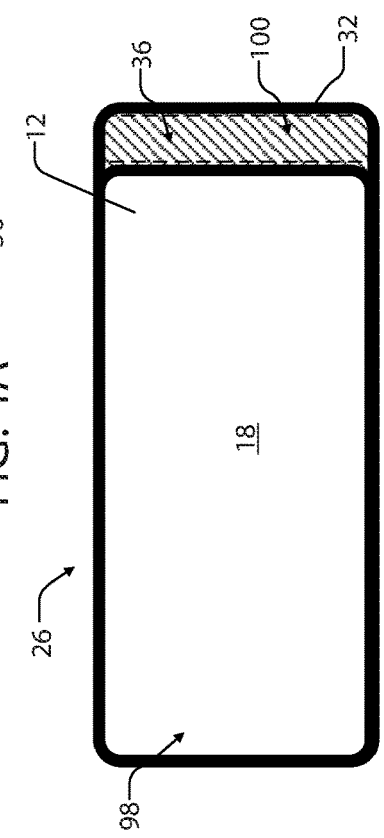
FIG. 4C is a front view of a display assembly demonstrating a configuration of a display driver for a waveguide of the display assembly.

In FIG. 4B, the display drivers 36 are shown extending along a first side portion 98 and a second side portion 100 of the display assembly 32. In FIG. 4C, the display drivers 36 are shown extending along the second side portion 100 of the display assembly 32. The first side 98 and the second side 100 may correspond to vertical perimeter portions of the display assembly 32 relative to the orientation of the display assembly 32 illustrated in FIG. 1. As shown in FIG. 4C, at least one of the display drivers 36 and/or various corresponding drive circuits or hardware may be distributed along the first portion 98 and the second portion 100 to provide a distributed edge mounted display.

Figure 5:
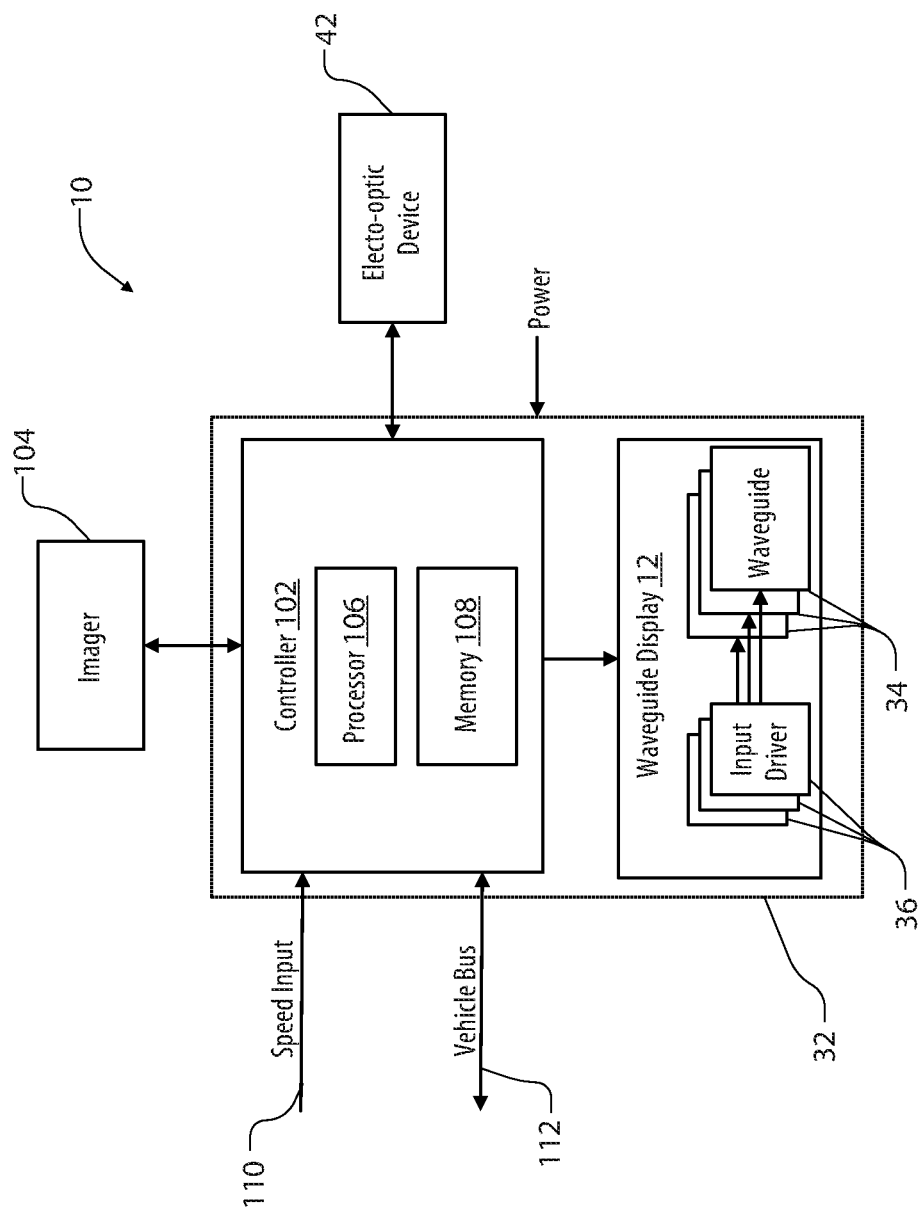
FIG. 5 is a block diagram of a display system in accordance with the disclosure.

Referring now to FIG. 5, a block diagram of the display system 10 is shown. As discussed herein, a controller 102 of the display system 10 may be in communication with at least one imager 104. In some embodiments, the imager 104 may correspond to a complementary metal-oxide-semiconductor (CMOS), for example, a CMOS active-pixel sensor (APS) or a charge-coupled device (CCD). In this configuration, the controller 102 may be operable to process the image data as supplied in analog or digital form from the imager 104.

The controller 102 may further be operable to output the image data captured by the imager 104 on the waveguide display 12. The waveguide display 12 may comprise the plurality of waveguides 34 configured to direct image data over the display window. The waveguide display 12 may further comprise a plurality of display drivers 36 configured to project image data and/or graphics into each waveguide of the plurality of waveguides 34. Each of the display drivers 36 may comprise a microdisplay, laser module, beam expansion, collimator, and relay optics configured to project the image data. Additional information regarding a waveguide display 12 is discussed in U.S. Pat. Application Publication No. 2014/0140654 A1, now U.S. Pat. No. 9,933,684, entitled, "TRANSPARENT WAVEGUIDE DISPLAY," which is incorporated by reference in its entirety.

The controller 102 may further be operable to control the electro-optic device 42 to control the reflectance of the received light 82. The electro-optic device 42 may comprise an electro-optic medium 64 configured to vary in transmittance in response to the transmission control signal or voltage level received from the controller 102 via the first electrode 58 and the second electrode 60. The electro-optic medium 64 may correspond to an electro-chromic medium. The controller 102 may comprise a processor 106 operable to process the image data as supplied in analog or digital format from the imager 104. In various embodiments, the processor 106 may be implemented as a plurality of processors, a multicore processor, or any combination of processors, circuits, and peripheral processing devices.

The controller 102 may further comprise a memory 108. The memory 108 may comprise various forms of memory, for example, random access memory (RAM), dynamic RAM (DRAM), synchronous DRAM (SDRAM), and other forms of memory configured to store digital information. The memory 108 may be configured to store the image data from the imager 104 for processing. Processing the image data may comprise scaling and cropping, as well as rendering graphical data for display on the waveguide display 12. In some embodiments, the memory 108 may further be configured to store additional programming information including method and processes for operation of the display system 10.

The controller 102 may further be in communication with a plurality of inputs from various vehicle systems, for example, a speed input 110 and a vehicle bus 112. The speed input 110 may provide a signal communicating a speed of the vehicle 28 via a speedometer or any device operable to measure and communicate data corresponding to the speed of a vehicle 28. The vehicle bus 112 may be implemented using any suitable standard communication bus, such as a Controller Area Network (CAN) bus, a Local Interconnect Network (LIN) bus, etc. The vehicle bus 112 may be configured to provide a variety of additional information to the controller 102. Such information may correspond to one or more vehicle states or a status indicator or indication, for example a gear selection, passenger occupancy, a headlight activation, etc., which may be utilized by the controller 102 to control the display 12 of the image data and/or the transmission state of the electro-optic device 42.

It will be appreciated that embodiments of the disclosure described herein may be comprised of one or more conventional processors and unique stored program instructions that control one or more processors to implement, in conjunction with certain non-processor circuits, some, most, or all of the functions of an image sensor system and method thereof, as described herein. The non-processor circuits may include, but, are not limited to, signal drivers, clock circuits, power source circuits, and/or user input devices. Alternatively, some or all functions could be implemented by a state machine that has no stored program instructions, or in one or more application specific integrated circuits (ASICs), in which each function or some combinations of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It should be appreciated by those skilled in the art that the above described components may be combined in additional or alternative ways not explicitly described herein. Modifications of the various implementations of the disclosure will occur to those skilled in the art and to those who apply the teachings of the disclosure. Therefore, it is understood that the embodiments shown in the drawings and described above are merely for illustrative purposes and not intended to limit the scope of the disclosure, which is defined by the following claims as interpreted according to the principles of patent law, including the Doctrine of Equivalents.

What is claimed is:

1. A vehicle display system, comprising:
   an electro-optic device comprising:
      a first substantially transparent substrate having first and second surfaces disposed on opposite sides thereof, wherein at least one of the first and second surfaces comprises a first electrically conductive layer;
      a second substantially transparent substrate having third and fourth surfaces disposed on opposite sides thereof, wherein at least one of the third and fourth surfaces comprises a second electrically conductive layer;
      an electro-optic medium disposed in a cavity formed between the first substantially transparent substrate and the second substantially transparent substrate, the electro-optic medium being variably transmissive;
   a substantially transparent display disposed adjacent to the electro-optic device;
   at least one display driver configured to display image data on the substantially transparent display; and
   a controller in communication with the electro-optic device and the at least one display driver, wherein the controller is operable to:
      control a transmission state of the electro-optic device between a transparent state and an opaque state; and
      control the display driver to display the image data on the substantially transparent display.

2. The display system according to claim 1, further comprising a reflective element disposed adjacent to the electro-optic device, wherein the reflective element is configured to reflect a reflected view of a rearward directed field of view from the vehicle.

3. The display system according to claim 2, wherein the controller is further configured to control the electro-optic device to selectively control a mirror configuration of the display system in response to the transmission state of the electro-optic device.

4. The display system according to claim 3, wherein the controller is further configured to control the display driver to display graphical data on the substantially transparent display.

5. The display system according to claim 4, wherein the graphical data is displayed superimposed over the reflected view in a hybrid display configuration.

6. The display system according to claim 4, wherein the controller is further in communication with one or more vehicle systems via a communication bus.

7. The display system according to claim 6, wherein the controller is further configured to receive a status indicator from the one or more vehicle systems and control the display driver to display the status indicator as the graphical data on the substantially transparent display.

8. A vehicle display system, comprising:
an electro-optic device comprising:
a first substantially transparent substrate having first and second surfaces disposed on opposite sides thereof, wherein at least one of the first and second surfaces comprises a first electrically conductive layer;
a second substantially transparent substrate having third and fourth surfaces disposed on opposite sides thereof, wherein at least one of the third and fourth surfaces comprises a second electrically conductive layer;
an electro-optic medium disposed in a cavity formed between the first substantially transparent substrate and the second substantially transparent substrate, the electro-optic medium being variably transmissive; and
a substantially transparent display configured to display image data and disposed adjacent to the electro-optic device, wherein the electro-optic device is configured to adjust the variable transmission of the electro-optic medium to convert a transmission state of the electro-optic device between a transparent state and an opaque state.

9. The display system according to claim 8, further comprising a controller and at least one display driver, wherein the controller is in communication with the electro-optic device and the at least one display driver.

10. The display system according to claim 9, wherein the controller is configured to:
communicate a transmission control signal configured to control the transmission state of the electro-optic device.

11. The display system according to claim 10, wherein the controller is configured to:
control a contrast of the substantially transparent display based on the transmission state of the electro-optic device.

12. The display system according to claim 11, wherein the substantially transparent display comprises at least one waveguide display element.

13. The display system according to claim 12, wherein the at least one waveguide display element is configured to receive the image data from the at least one display driver.

14. The display system according to claim 11, further comprising a reflective element disposed adjacent to the electro-optic element, wherein the reflective element is configured to reflect a reflected view of a rearward directed field of view from the vehicle.

15. The display system according to claim 14, wherein the electro-optic device is configured to selectively control a mirror configuration of the display system in response to the transmission state of the electro-optic device.

16. The display system according to claim 14, wherein the substantially transparent display is configured to superimpose the image data over the reflected view.

17. The display system according to claim 9, wherein the at least one display driver is mounted along a portion of a perimeter of the substantially transparent display.

18. The display system according to claim 8, wherein the electro-optic medium is an electrochromic medium.

19. The display system according to claim 8, wherein the substantially transparent display forms the first substantially transparent substrate or the second substantially transparent substrate.

20. A vehicle display apparatus, comprising:
an electrochromic device comprising a reflective element, wherein the reflective element is configured to reflect a reflected view of a rearward directed field of view from the vehicle;
a substantially transparent display disposed adjacent to the electrochromic device;
at least one display driver configured to display image data on the substantially transparent display; and
a controller in communication with the electrochromic device and the at least one display driver, wherein the controller is operable to:
control the display apparatus to selectively control a transmission state of the electrochromic device to a mirror state and a substantially transparent state; and
control the display driver to display the image data on the substantially transparent display.

* * * * *